UNITED STATES PATENT OFFICE.

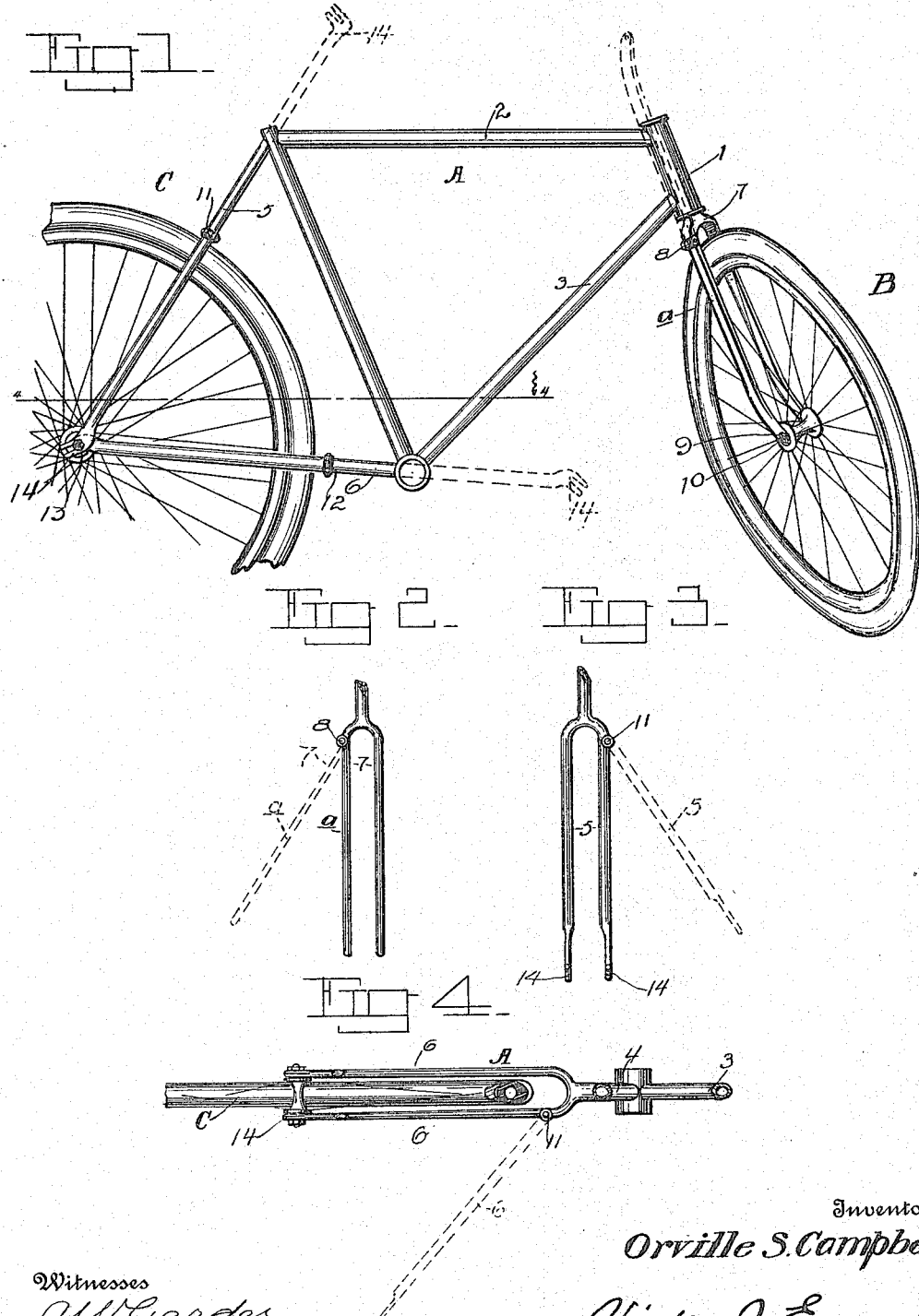

ORVILLE S. CAMPBELL, OF OGLESBY, ILLINOIS.

BICYCLE-FRAME.

1,122,071.  Specification of Letters Patent.  Patented Dec. 22, 1914.

Application filed October 4, 1910. Serial No. 585,317.

*To all whom it may concern:*

Be it known that I, ORVILLE S. CAMPBELL, a citizen of the United States, residing at Oglesby, in the county of La Salle and State of Illinois, have invented new and useful Improvements in Bicycle-Frames, of which the following is a specification.

This invention relates to a bicycle or motor frame and the principal object of the invention is to so construct the frame that the tires of the wheels can be removed for the purpose of repair or renewal without the wheels being removed from the frame.

Another object of the invention is to provide a novel fork construction whereby one member of the fork includes a hinge so that by merely removing the nut of the axle, such member can be swung laterally for permitting the tire of the wheel to be readily detached without disconnecting the axle of the wheel with the other member of the fork.

With such and other objects in view, as will appear as the description proceeds, the invention comprises the various novel features of construction and arrangement of parts which will be more fully described hereinafter, and set forth with particularity in the claim appended hereto.

In the accompanying drawings, which illustrate one embodiment of the invention, Figure 1 is a side view of the bicycle frame. Fig. 2 is a front view of the front fork. Fig. 3 is a rear view of the upper rear fork. Fig. 4 is a sectional view on line 4—4, Fig. 1.

Similar reference characters are employed to designate corresponding parts throughout the views.

Referring to the drawings, A designates the ordinary diamond frame, to which the front and rear wheels B and C are attached. The diamond frame consists of the head 1, top bar 2, diagonal bar 3, and seat post or bar 4, all integrally connected, and behind the bar 8 are the upper and lower rear forks 5 and 6. Attached to the head 1 is the front fork 7 to which the front wheel is attached. This fork 7 has its right member *a* connected by a hinge joint 8 with the crown or head of the fork, the pintle of the joint 8 being so disposed that the part *a* can be swung laterally outwardly and upwardly when the nut 9 is removed from the axle 10. The joint 8 is arranged at a greater distance from the axle 10 than the radius of the wheel, so that when the member *a* is swung to open position, the tire of the wheel B can be removed, it being understood that the axle remains attached to the other member of the fork 7. The right members of the rear forks 5 and 6 are provided with joints 11 and 12, respectively, that are located at a distance from the rear axle 13 greater than the radius of the rear wheel, and by means of these joints the right members of the forks can be swung to the dotted line position, Fig. 1, when it is desired to remove the rear tire. The right members of the rear forks 5 and 6 are provided with bifurcated ends 14 which overlap each other and register so that the rear axle can be attached to these members of the rear forks. By constructing the frame in this manner, the tire can be detached without removing the rear wheel, thereby avoiding a great amount of labor and annoyance in re-setting the rear wheel, as is necessary with the bicycle frames in common use. A further useful purpose of the rear fork construction resides in the fact that the driving chain of the bicycle may be removed completely without having to separate any of its links, as is ordinarily the case. In order to accomplish this, it is merely necessary to disconnect the bifurcated end of the pivoted member of the upper rear fork from the axle 13, without disturbing the coacting pivoted member of the lower fork whereupon the said member may be swung laterally and upwardly into its inoperative position to permit complete detachment and withdrawal of the chain.

From the foregoing description, taken in connection with the accompanying drawings, the advantages of the construction and of the method of operation will be readily apparent to those skilled in the art to which the invention appertains, and while I have described the principle of operation of the invention, together with the device which I now consider to be the best embodiment thereof, I desire to have it understood that the device shown is merely illustrative, and that such changes may be made when desired as are within the scope of the claim appended hereto.

Having thus described the invention, what I claim as new, is:—

In a bicycle construction, the combination of a frame including a lower rear fork and an upper rear fork, corresponding side members of both forks being separable and pivotally connected with the frame, the said pivoted members having their free ends bifurcated to provide slots adapted to register with each other, and a wheel adapted to be disposed within the forks with its axle connected with the slots of the said fork members.

In testimony whereof I affix my signature in presence of two witnesses.

ORVILLE S. CAMPBELL.

Witnesses:
WILLIAM J. RICHARDS,
JOHN HARTMAN.

Copies of this patent may be obtained for five cents each, by addressing the "Commissioner of Patents, Washington, D. C."